United States Patent
Baalachandar N et al.

(10) Patent No.: US 10,291,470 B1
(45) Date of Patent: May 14, 2019

(54) SELECTIVE STORAGE OF NETWORK DEVICE ATTRIBUTES

(71) Applicant: Juniper Networks, Inc., Sunnyvale, CA (US)

(72) Inventors: Aswin Baalachandar N, Coimbatore (IN); Abdul Kadhar Jeelany Habeeb Mohamed, Chennai (IN); Nithyananda Vishnu K S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 249 days.

(21) Appl. No.: 15/200,324

(22) Filed: Jul. 1, 2016

(51) Int. Cl.
*H04L 12/24* (2006.01)

(52) U.S. Cl.
CPC ........ *H04L 41/082* (2013.01); *H04L 41/0856* (2013.01)

(58) Field of Classification Search
CPC .......................... H04L 41/082; H04L 41/0856
See application file for complete search history.

(56) References Cited

U.S. PATENT DOCUMENTS

| | | | | |
|---|---|---|---|---|
| 7,613,796 | B2 * | 11/2009 | Harvey | H04L 12/56 709/220 |
| 8,151,103 | B2 * | 4/2012 | Jackson | G06F 9/505 713/100 |
| 2003/0074430 | A1 * | 4/2003 | Gieseke | H04L 41/0213 709/221 |
| 2004/0122922 | A1 * | 6/2004 | Da Palma | H02J 13/00 709/223 |
| 2005/0203910 | A1 * | 9/2005 | Taguchi | G06F 3/0605 |
| 2006/0235971 | A1 * | 10/2006 | McCloghrie | H04L 41/0213 709/225 |
| 2008/0027948 | A1 * | 1/2008 | Corley | G06F 9/5083 |
| 2012/0323861 | A1 * | 12/2012 | Acuna | G06F 17/30519 707/692 |
| 2013/0159366 | A1 * | 6/2013 | Lyle | G06F 17/30194 707/827 |
| 2014/0280802 | A1 * | 9/2014 | McDowall | H04L 41/0816 709/221 |
| 2015/0278303 | A1 * | 10/2015 | Beilmann | G06F 17/30442 707/713 |

(Continued)

OTHER PUBLICATIONS

Wikipedia, "Simple Network Management Protocol," https://en.wikipedia.org/wiki/Simple_Network_Management_Protocol, Jun. 23, 2016, 13 pages.

*Primary Examiner* — Philip J Chea
*Assistant Examiner* — Wing Ma
(74) *Attorney, Agent, or Firm* — Harrity & Harrity, LLP

(57) ABSTRACT

A first device may receive a network information request that identifies a data object relating to a network device. The data object may correspond to or identify an attribute associated with the network device. The first device may determine that the attribute is a static attribute relating to a configuration of the network device. The first device may determine whether a second device stores the data object. The second device may store data objects corresponding to static attributes. The first device may selectively obtain the data object from the network device or from the second device based on determining whether the second device stores the data object. The first device may provide the data object based on the network information request.

20 Claims, 7 Drawing Sheets

(56) References Cited

U.S. PATENT DOCUMENTS

2016/0014008 A1* 1/2016 Metts ................. H04L 43/0847
  370/252
2016/0366040 A1* 12/2016 Nampelly ............... H04L 43/12
2017/0104813 A1* 4/2017 Liu .......................... H04L 67/10
2018/0006873 A1* 1/2018 Yang ....................... H04L 41/12

* cited by examiner

SELECTIVE STORAGE OF NETWORK DEVICE ATTRIBUTES

BACKGROUND

Network devices (e.g., firewalls, routers, gateways, switches, hubs, bridges, printers, webcams, etc.) may be associated with attributes that identify information relating to the network devices. The information may include configuration information, usage information, network traffic information, or the like. Based on the information, a network management device may configure or manage a network that includes the network devices.

SUMMARY

A first device may include one or more processors. The one or more processors may receive a network information request that identifies a data object relating to a network device. The data object may correspond to or identify an attribute associated with the network device. The one or more processors may determine that the attribute is a static attribute relating to a configuration of the network device. The one or more processors may determine whether a second device stores the data object. The second device may store data objects corresponding to static attributes. The one or more processors may selectively obtain the data object from the network device or from the second device based on determining whether the second device stores the data object. The one or more processors may obtain the data object from the network device when the second device does not store the data object, and the one or more processors may obtain the data object from the second device when the second device stores the data object. The one or more processors may provide the data object based on the network information request.

A non-transitory computer-readable medium may store one or more instructions that, when executed by one or more processors of a first device, cause the one or more processors to receive a network information request that identifies a data object relating to a network device. The data object may correspond to an attribute associated with the network device. The one or more instructions, when executed by the one or more processors, may cause the one or more processors to determine that the attribute is a static attribute that relates to a configuration of the network device. The one or more instructions, when executed by the one or more processors, may cause the one or more processors to determine whether a second device stores the data object based on determining that the attribute is a static attribute that relates to a configuration of the network device. The second device may store data objects that correspond to static attributes and that have previously been obtained from the network device by the first device. The one or more instructions, when executed by the one or more processors, may cause the one or more processors to selectively obtain the data object from the network device, or from the second device, based on determining whether the second device stores the data object. The one or more instructions, when executed by the one or more processors, may cause the one or more processors to obtain the data object from the network device when the second device does not store the data object. The one or more instructions, when executed by the one or more processors, may cause the one or more processors to obtain the data object from the second device when the second device stores the data object. The one or more instructions, when executed by the one or more processors, may cause the one or more processors to provide the data object based on the network information request.

A method may include receiving, by a first device, a request to obtain a data object relating to a network device. The data object may correspond to an attribute associated with the network device. The method may include determining, by the first device, that the attribute is a static attribute. The static attribute may be an attribute that relates to a configuration of the network device. The method may include determining, by the first device, whether a second device stores the data object. The second device may store data objects that correspond to static attributes and that have previously been obtained from the network device. The method may include selectively obtaining, by the first device, the data object from the network device, or from the second device, based on determining whether the second device stores the data object. The data object may be obtained from the network device when the second device does not store the data object, and may be obtained from the second device when the second device stores the data object. The method may include providing, by the first device, the data object based on the request.

DETAILED DESCRIPTION

Figure 1A:
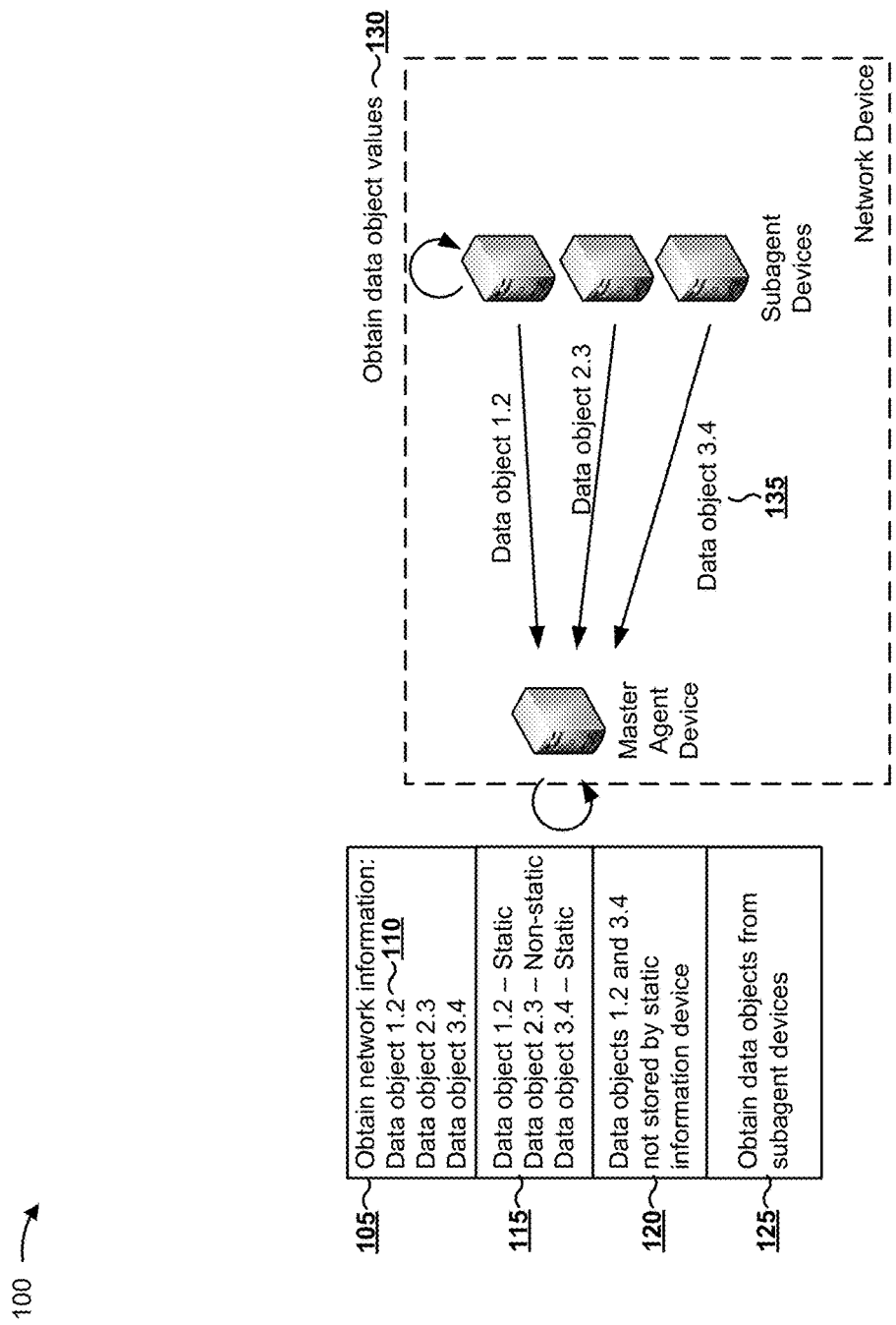
FIGS. 1A-1C are diagrams of an overview of an example implementation described herein.

The following detailed description of example implementations refers to the accompanying drawings. The same reference numbers in different drawings may identify the same or similar elements.

Network devices may be associated with attributes that identify configuration, usage, traffic utilization, session times, and/or other information that relates to operation of the network devices. A network management device may monitor or configure a network that includes the network devices based on the attributes. For example, the network management device may determine routing information, network topology information, network device performance, service outages, unauthorized access, or the like, based on the attributes.

The network management device may obtain the attributes based on a protocol, such as the Simple Network Management Protocol (SNMP) or a similar protocol. To obtain an attribute using SNMP, the network management device may transmit, to a master agent device or component, a network information request that identifies a data object that corresponds to or identifies a value of the attribute. For example, the data object may be indexed with other data objects in a data structure (e.g., sometimes referred to as a management information base, or MIB). The master agent device may obtain the value of the data object (i.e., the attribute) from a subagent and/or network device associated with the attribute, and may provide the value of the data object to the network management device.

However, querying the network device for the value of the data object may be processor-intensive for the subagent device and/or the network device. Furthermore, in some cases, the network management device may repeatedly request particular data objects. For example, the network management device may perform a monitoring function based on values of the particular data objects and, thus, may repeatedly or periodically request the values of the particular data objects. This may increase processor usage of the subagent device.

Implementations described herein use a static information device to store data objects relating to static attributes. A static attribute is an attribute that relates to configuration of a network device (e.g., a physical address, a router name, a physical interface name, etc.). Values of static attributes may be relatively unlikely to vary in comparison to values of attributes relating to network traffic, session times, or the like. A master agent device may obtain the data object corresponding to the static attribute from the network device based on receiving a network information request from the network management device, and may provide the data object to the static information device for storage. For each subsequent network information request pertaining to the data object, the master agent device may obtain the data object from the static information device.

In this way, processor resources and network resources of subagent devices are conserved, and an amount of time that would otherwise be used to request and obtain the data object from the subagent device in every case is reduced. For example, in some cases, a network management device or a network device may be associated with a script that automatically queries particular data objects (and/or corresponding object identifiers) based on a particular time interval. In such cases, implementations described herein reduce a quantity of times that subagent devices must obtain the particular data objects, thereby conserving processor resources of the subagent devices.

Figure 1B:
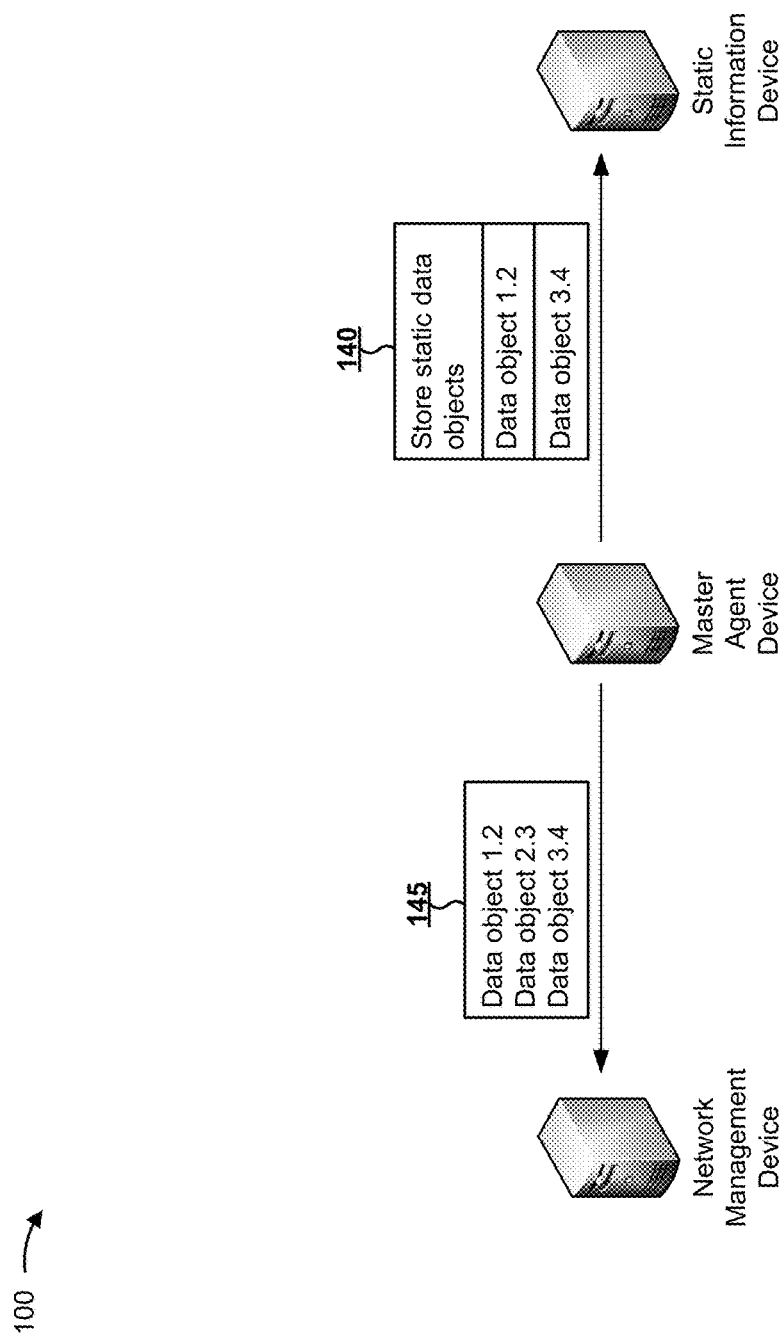
Figure 1C:
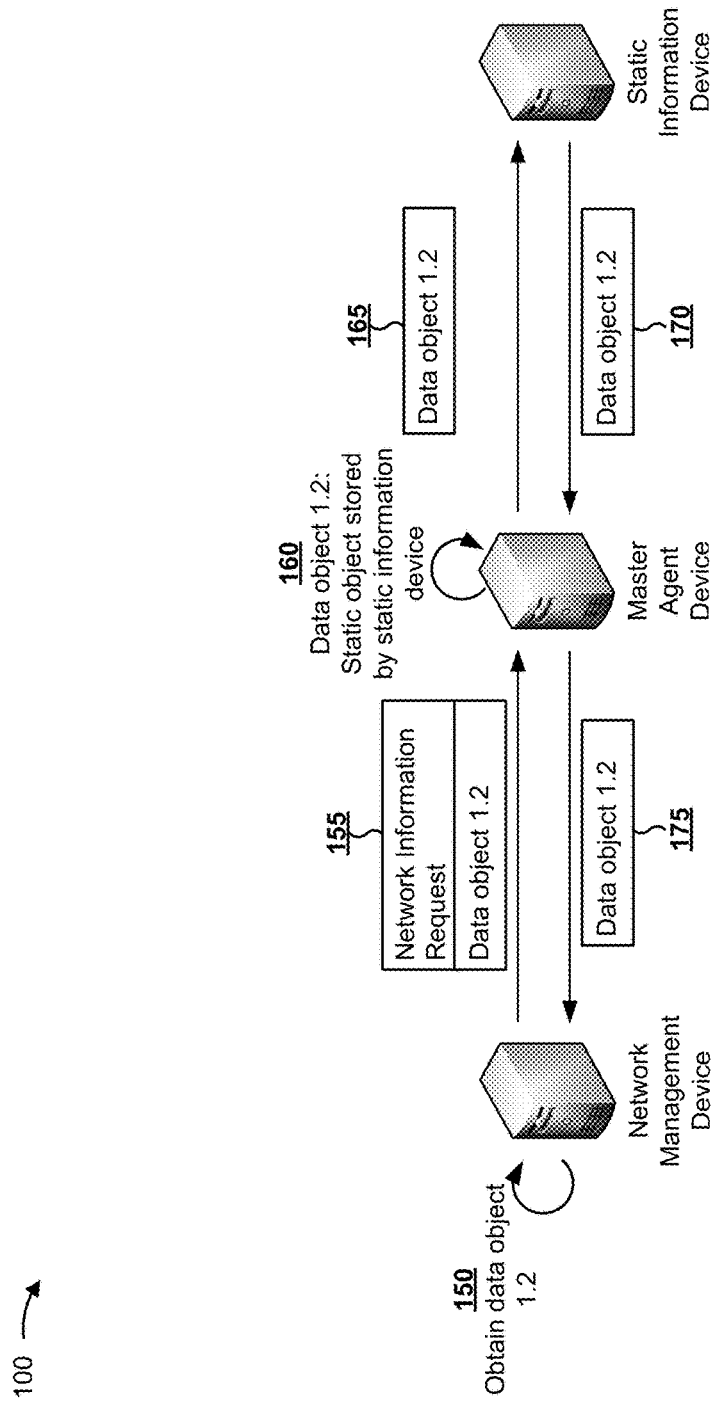

FIGS. 1A-1C are diagrams of an overview of an example implementation 100 described herein. For the purpose of FIGS. 1A-1C, assume that a network device is associated with a first set of data objects (e.g., data objects 1.1 through 1.N, where N is greater than 1), a second set of data objects (e.g., data objects 2.1 through 2.O, where O is greater than 1), and a third set of data objects (e.g., data objects 3.1 through 3.P, where P is greater than 1).

As shown in FIG. 1A, and by reference number 105, a master agent device of a network device may determine to obtain network information corresponding to three data objects (e.g., object 1.2, object 2.3, and object 3.4). As shown by reference number 110, the data objects are associated with object identifiers of 1.2, 2.3, and 3.4, respectively, and the master agent device may obtain the data objects based on the object identifiers, as described in more detail elsewhere herein.

As shown by reference number 115, the master agent device may determine whether each data object identified by the network information request corresponds to a static attribute or a non-static attribute. As described above, a static attribute is an attribute that relates to configuration of a network device. A non-static attribute is an attribute that is likely to change over time. For example, a non-static attribute may relate to a session time, a network traffic metric, a data flow, a particular packet, or the like. In some cases, a static attribute may be less likely than a non-static attribute to change in value. As shown, the master agent device determines that data object 1.2 and data object 3.4 are static objects (i.e., that data objects 1.2 and 3.4 correspond to static attributes), and that data object 2.3 is a non-static object (i.e., that data object 2.3 corresponds to a non-static attribute).

As shown by reference number 120, the master agent device may determine that data objects 1.2 and 3.4 are not stored by a static information device. The static information device may store data objects that correspond to static attributes and that have been previously obtained from the network device by the master agent device. The master agent device may determine that data objects 1.2 and 3.4 are not stored by the static information device based on accessing the static information device, based on stored information indicating that the master agent device has not previously provided data objects 1.2 and 3.4 to the static information device for storage, or based on other information.

As shown by reference number 125, the master agent device may obtain the data objects from subagent devices of the network device (e.g., from subagent daemons of an SNMP environment, etc.). For example, based on determining that data object 1.2 is not stored by the static information device, the master agent device may transmit an object request to a first subagent device to obtain data object 1.2. As another example, based on determining that data object 2.3 corresponds to a non-static attribute, the master agent device may transmit an object request to a second subagent device to obtain data object 2.3. As yet another example, based on determining that data object 3.4 is not stored by the static information device, the master agent device may transmit an object request to a third subagent device to obtain data object 3.4. As shown by reference number 130, the subagent devices may obtain the data object values of data objects 1.2, 2.3, and 3.4 (e.g., from an MIB). As shown by reference number 135, the subagent devices may provide the data object values to the master agent device.

As shown in FIG. 1B, and by reference number 140, based on obtaining data objects 1.2 and 3.4 from the network devices (i.e., the data objects corresponding to static attributes), the master agent device may provide data objects 1.2 and 3.4 to the static information device for storage. In some implementations, the master agent device may not provide data object 2.3 to the static information device for storage based on a value of data object 2.3 being likely to change before another request for data object 2.3 is received. As shown by reference number 145, the master agent device may provide data objects 1.2, 2.3, and 3.4 to the network management device based on the network information request.

As shown in FIG. 1C, and by reference number 150, a network management device may determine to obtain data object 1.2. Assume that data object 1.2 is not stored in the local cache of the network device. As shown by reference number 155, the network management device may provide a network information request to the master agent device. As shown, the network information request may identify data object 1.2. As shown by reference number 160, the master agent device may determine that data object 1.2 corresponds to a static attribute, and may determine that data object 1.2 is stored by the static information device. For example, the master agent device may determine that data object 1.2 is stored by the static information device based on having previously provided data object 1.2 to the static information device for storage.

As shown by reference number 165, based on determining that data object 1.2 is stored by the static information device, the master agent device may transmit an object request to the static information device to obtain data object 1.2. As shown by reference number 170, the static information device may provide data object 1.2 to the master agent device based on the object request. In this way, the master agent device conserves processor resources of the subagent devices and/or the network device that would otherwise be used to request and/or obtain data object 1.2. Further, the master agent device may obtain data object 1.2 from the static information device more quickly than from the network device. As shown by reference number 175, the master agent device may provide data object 1.2 to the network management device. In some implementations, the master agent device may store data object 1.2, or may provide data object 1.2 to a different device.

In this way, the master agent device conserves processor resources and network resources of subagent devices, and reduces an amount of time, that would otherwise be used to repeatedly request and obtain, from network devices, data objects corresponding to static attributes of the network devices (e.g., based on repetitive requests for the data objects).

As indicated above, FIGS. 1A-1C are provided merely as an example. Other examples are possible and may differ from what was described with regard to FIGS. 1A-1C.

Figure 2:
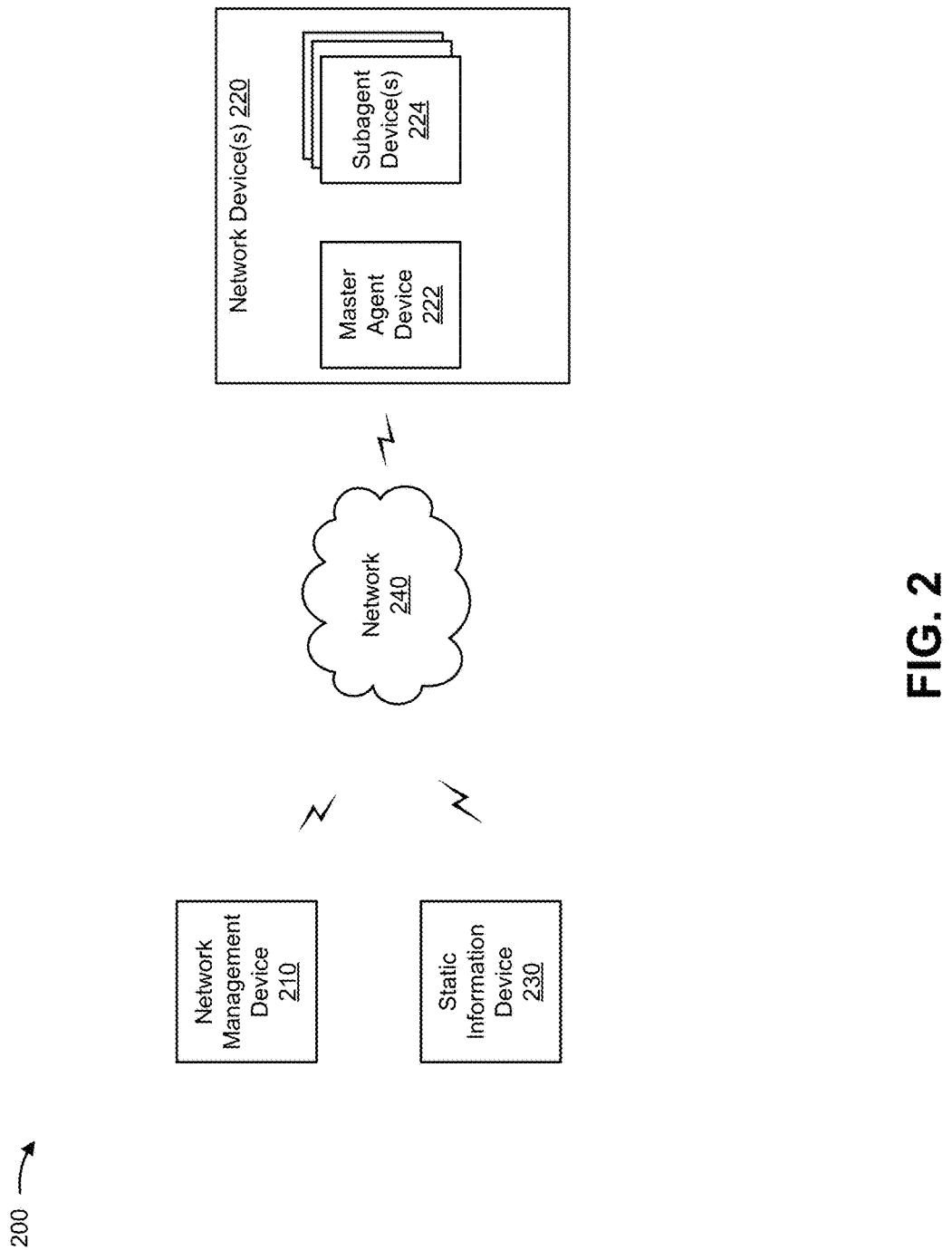
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network management device 210, one or more network device(s) 220, a static information device 230, and a network 240. As further shown, each network device 220 may be associated with a master agent device 222 and one or more subagent devices 224. Devices of environment 200 may interconnect via wired connections, wireless connections, or a combination of wired and wireless connections.

Network management device 210 includes one or more devices capable of receiving, generating, storing, processing, and/or providing network information and/or network information requests. For example, network management device 210 may include a computing device, such as a server, a desktop computer, a laptop computer, a tablet computer, or the like. In some implementations, network management device 210 may include a manager application of an SNMP environment, and may manage network devices 220 using SNMP or another protocol.

Network device 220 includes one or more devices that receive, transmit, route, and/or provide network traffic. For example, network device 220 may include a firewall, a router, a gateway, a switch, a hub, a bridge, a reverse proxy, a server (e.g., a proxy server), a security device, an intrusion detection device, a load balancer, a printer, a desktop computer, a laptop computer, a tablet computer, a smart phone, or a similar device. Network device 220 may be associated with one or more data objects and/or attributes, which are described in more detail elsewhere herein. In some implementations, network device 220 may include a managed network node of an SNMP environment. In some implementations, network device 220 may be associated with local memory (e.g., a cache) that stores data object values.

Network device 220 may be associated with master agent device 222 and one or more subagent devices 224. Master agent device 222 includes one or more devices, processes, and/or components that receive a network information request from network management device 210 and that provide network information (e.g., data objects) to network management device 210. For example, master agent device 222 may include a master agent of an SNMP environment.

Master agent device 222 may obtain network information from subagent devices 224. Subagent device 224 includes one or more devices, processes, or components that obtain a value of a data object from network device 220. For example, subagent device 224 may include or be associated with an SNMP subagent that determines data objects and/or attributes of network device 220 and that provides the data objects and/or attributes to master agent device 222 (e.g., based on object requests identifying the data objects). In some implementations, subagent device 224 may include one or more processes or daemons, such as a routing protocol daemon, an interface daemon, a chassis daemon, or the like.

Static information device 230 includes one or more devices capable of receiving, storing, and/or providing information relating to network device(s) 220 (e.g., data objects, static attributes, etc.). For example, static information device 230 may include a server, a group of servers, a cloud computing environment, a cache memory, or the like.

Network 240 includes one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
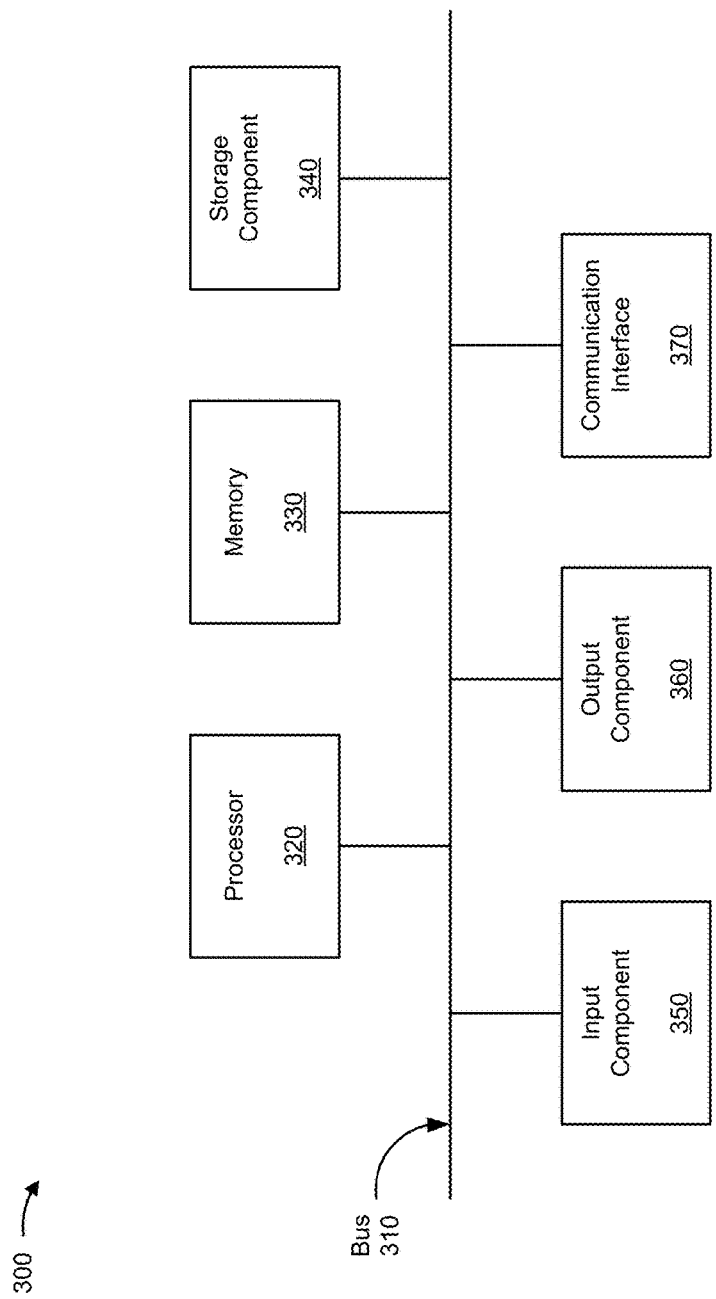
FIG. 3 is a diagram of example components of one or more devices of FIG. 2.

FIG. 3 is a diagram of example components of a device 300. Device 300 may correspond to network management device 210, network device 220, and/or static information device 230. In some implementations, network management device 210, network device 220, and/or static information device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
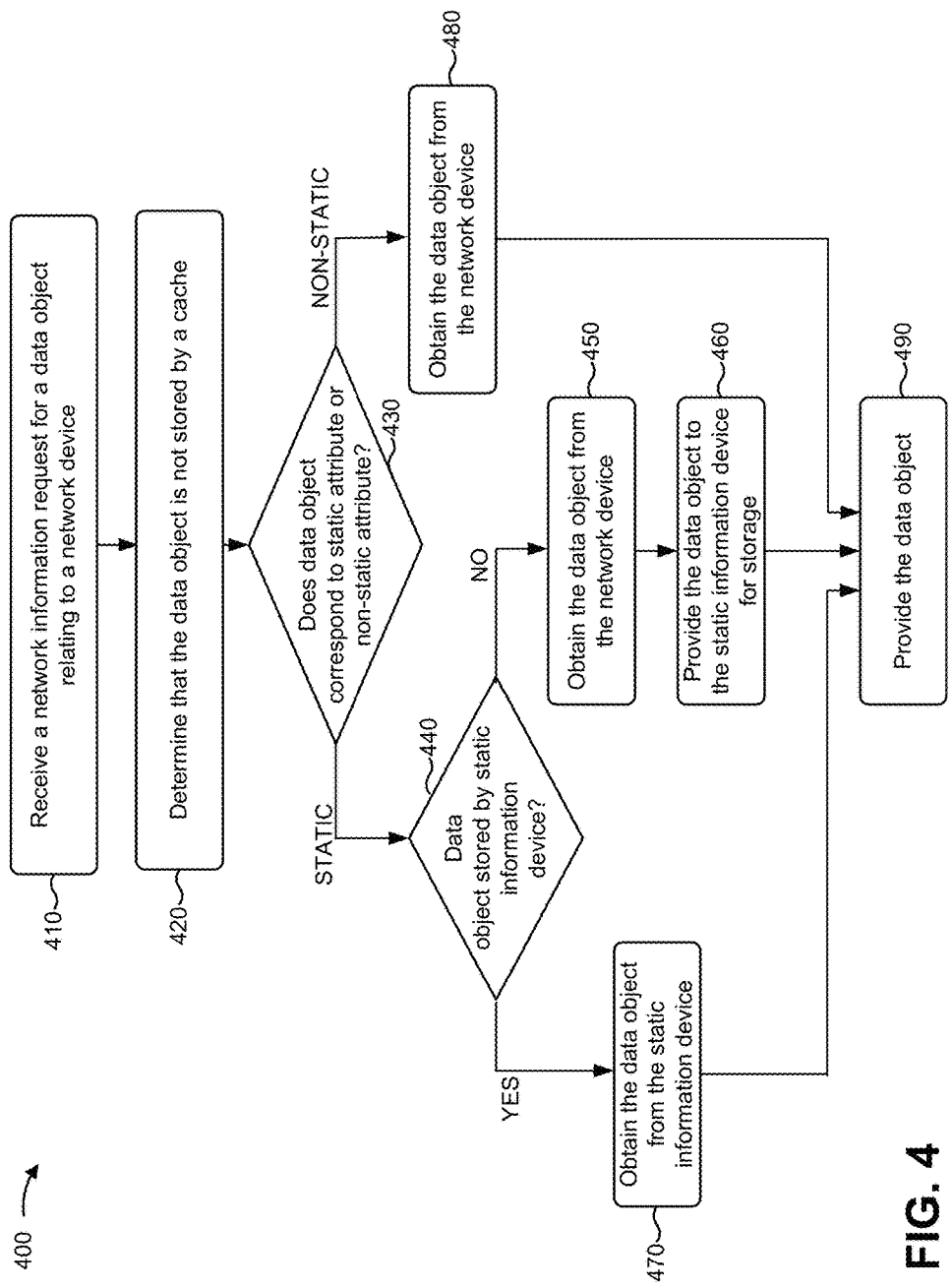
FIG. 4 is a flow chart of an example process for selectively obtaining data objects from a static information device or from a network device.

FIG. 4 is a flow chart of an example process 400 for selectively obtaining data objects from a static information device or from a network device. In some implementations, one or more process blocks of FIG. 4 may be performed by network device 220 (e.g., master agent device 222 of network device 220). In some implementations, one or more process blocks of FIG. 4 may be performed by another device or a group of devices separate from or including network device 220, such as network management device 210 and/or static information device 230.

As shown in FIG. 4, process 400 may include receiving a network information request for a data object relating to a network device (block 410). For example, master agent device 222 may receive a network information request from network management device 210. The network information request may identify one or more data objects to be obtained from network device 220 (e.g., subagent device 224 of network device 220). Network management device 210 may provide the network information request to obtain values of attributes associated with one or more network devices 220 in order to perform monitoring operations, reconfiguration operations, network management operations, or the like.

The network information request may identify one or more data objects to be obtained by master agent device 222. For example, the network information request may include one or more object identifiers corresponding to the one or more data objects. As another example, the network information request may identify a particular network device 220, and may request one or more data objects associated with the particular network device 220 (e.g., all data objects associated with the particular network device 220, a subset of data objects associated with the particular network device 220, etc.). The data objects may correspond to static attributes of network device 220 and/or non-static attributes of network device 220, as described in more detail elsewhere herein.

In some implementations, a data object may include a tabular data object. A tabular data object may identify multiple, different attributes of network device 220. Each attribute of network device 220 of the tabular data object may be associated with a different object identifier. For example, assume that a particular data object is associated with an object identifier of 1.1, and assume that the particular data object is a tabular data object that corresponds to ten attributes. In such a case, the ten attributes may be associated with object identifiers of 1.1.1, 1.1.2, 1.1.3, and so on. A network information request may request the particular data object corresponding to the object identifier of 1.1 to obtain values of each of the ten attributes. Additionally, or alternatively, a network information request may request one or more of the ten attributes by providing one or more of the object identifiers corresponding to the ten attributes. Other examples of object identifiers are possible, and implementations described herein are not limited to the above implementation of object identifiers.

As further shown in FIG. 4, process 400 may include determining that the data object is not stored by a cache (block 420). For example, network device 220 or network management device 210 may determine that the data object has not been cached. In some implementations, network device 220 may store or cache data object values for a particular length of time (e.g., 500 milliseconds, 1 second, 5 seconds, 10 seconds, etc.) after obtaining the data object values. When network management device 210 determines to obtain a particular data object, network management device 210 may determine whether the particular data object is present in a cache. When the particular data object is present in the cache, network management device 210 may obtain the particular data object from the cache, thus conserving processor resources of subagent device 224 and/or network device 220. When the particular data object is not present in the cache, network management device 210 may transmit a network information request for the particular data object to master agent device 222. In some implementations, network device 220 may determine whether the data object has been cached. For example, network device 220 may receive a network address request for the data object and may determine whether the data object has been cached based on the network address request.

As further shown in FIG. 4, process 400 may include determining whether the data object corresponds to a static attribute of the network device or a non-static attribute of the network device (block 430). For example, master agent device 222 may determine whether the data object corresponds to a static attribute of network device 220 or a non-static attribute of network device 220. In some implementations, master agent device 222 may perform this determination based on a name or an object identifier included in the network information request. For example, the object identifier may include an offset, a flag, a particular format, or other information indicating that the data object corresponds to a static attribute or a non-static attribute. In some implementations, master agent device 222 may determine whether a data object corresponds to a static attribute based on information stored by master agent device 222 identifying static attributes, or the like.

A static attribute may include an attribute of network device 220 that relates to a configuration of network device 220. For example, a static attribute may include a physical address of network device 220, a router name of network device 220, a physical interface name of network device 220, a configuration of a keep-alive message to be transmitted or received by network device 220, or the like.

A non-static attribute may include an attribute of network device 220 that is likely to return a different value each time the non-static attribute is queried. For example, a non-static attribute may correspond to a network traffic measurement, one or more particular packets that are routed via network device 220, one or more particular octets or packets that are routed via network device 220, session timing information, or the like. Master agent device 222 may obtain non-static attributes from network device 220 based on values of the non-static attributes being likely to change between network information requests, as described in more detail elsewhere herein.

As further shown in FIG. 4, if the data object corresponds to a static attribute of the network device (block 430—STATIC), then process 400 may include determining whether the data object is stored by a static information device (block 440). For example, when the data object corresponds to a static attribute, master agent device 222 may determine whether the data object is stored by static information device 230. Static information device 230 may store a data object when the data object corresponds to a static attribute, and when the data object has previously been provided to static information device 230 for storage. For example, when master agent device 222 determines that static information device 230 has not stored a particular data object corresponding to a static attribute, master agent device 222 may obtain the particular data object and may provide the particular data object to static information device 230 for storage, as described in more detail elsewhere herein.

In some implementations, master agent device 222 may store information identifying data objects that are stored by static information device 230, and may determine whether a requested data object is stored by static information device 230 based on the stored information. For example, when master agent device 222 provides a data object to static information device 230 for storage, master agent device 222 may store and/or provide, to other master agent devices 220, information indicating that static information device 230 has stored the data object. By storing information identifying data objects stored by static information device 230, agent device 222 conserves processor and network resources that would otherwise be used to request information indicating whether static information device 230 stores particular data objects.

In some implementations, agent device 222 may determine whether static information device 230 stores the requested data object based on transmitting a query to static information device 230. For example, agent device 222 may transmit a request, to static information device 230, for information indicating whether static information device 230 stores a particular data object. By requesting information indicating whether static information device 230 stores the particular data object, agent device 222 conserves storage resources that would otherwise be used by agent device 222 to store information indicating whether static information device 230 stores the particular data object.

As further shown in FIG. 4, if the data object corresponds to a static attribute of the network device and if the data object is not stored by the static information device (block 440—NO), then process 400 may include obtaining the data object from the network device (block 450). For example, when master agent device 222 determines that static information device 230 does not store a value of the data object, and when the data object corresponds to a static attribute, master agent device 222 may obtain the value of the data object from subagent device 224. Master agent device 222 may obtain the value of the data object from subagent device 224 based on providing a request for the value of the data object. For example, master agent device 222 may provide an object request, including an object identifier corresponding to the data object, to subagent device 224 (e.g., based on SNMP or another protocol). Based on the object request, subagent device 224 may provide the data object to master agent device 222. In some implementations, subagent device 224 may provide multiple, different data objects or static attributes to master agent device 222 (e.g., when the data object is a tabular data object, when the object request identifies multiple, different data objects, etc.).

As further shown in FIG. 4, process 400 may include providing the data object to the static information device for storage (block 460). For example, when master agent device 222 receives a data object corresponding to a static attribute that static information device 230 does not store, master agent device 222 may provide the data object to static information device 230 for storage. When master agent device 222 subsequently receives another network information request for the data object, master agent device 222 may obtain the data object from static information device 230, thus conserving processor resources of subagent device 224 and network device 220. Further, obtaining the data object from static information device 230 may reduce latency of obtaining the data object as compared to obtaining the object from subagent device 224.

In some implementations, static information device 230 may delete one or more data objects from storage. For example, static information device 230 may store data objects for a threshold amount of time (e.g., ten seconds, one minute, one hour, one day, etc.), and may delete the data objects after the threshold amount of time has passed. As another example, static information device 230 may store a particular quantity of data objects, and may delete data objects after the particular quantity of data objects has been exceeded. In such a case, static information device 230 may delete the oldest stored data object or objects, may delete infrequently requested data objects, or the like. As other examples, static information device 230 may delete one or more data objects based on rebooting, after a period of inaction, or the like. In this way, storage resources of static information device 230 are conserved.

In some implementations, a device other than static information device 230 may cause static information device 230 to delete one or more data objects from storage. For example, network management device 210 or master agent device 222 may transmit an instruction to static information device 230 to delete one or more data objects from storage, and static information device 230 may delete the one or more data objects based on the instruction. In this way, storage resources of static information device 230 are conserved.

In some implementations, master agent device 222 may provide an updated value of a static attribute to static information device 230 for storage. For example, assume that static information device 230 stores an original value of a static attribute corresponding to a particular data object. Assume further that master agent device 222 determines that the static attribute has been reconfigured (e.g., based on a Remote Authentication Dial-In User Service (RADIUS) command to modify the static attribute, an Access Node Control Protocol (ANCP) command to modify the static attribute, a notification from network device 220 that the static attribute has been reconfigured, etc.). In such a case, master agent device 222 may obtain an updated value of the particular data object from network device 220, and may provide the updated value to static information device 230 for storage. In this way, master agent device 222 updates data objects stored by static information device 230 based on reconfiguration of network device 220, thereby reducing a quantity of data objects to be requested from network device 220 and, thus, conserving processor resources of subagent device 224 and network device 220.

As further shown in FIG. 4, if the data object corresponds to a static attribute of the network device and if the data object is stored by the static information device (block 440—YES), then process 400 may include obtaining the data object from the static information device (block 470). For example, when static information device 230 stores the data object, master agent device 222 may obtain the data object from static information device 230. Thus, master agent device 222 conserves processor and network resources that would otherwise be used to obtain the data object from subagent device 224 and/or network device 220. Further, master agent device 222 may reduce latency associated with obtaining the data object by obtaining the data object from static information device 230. For example, when static information device 230 and master agent device 222 are associated with the same device, or when static information device 230 is included as a component of master agent device 222, master agent device 222 may obtain the data object more quickly from static information device 230 than from subagent device 224.

As further shown in FIG. 4, if the data object corresponds to a non-static attribute of the network device (block 430—NON-STATIC), then process 400 may include obtaining the data object from the network device (block 480). For example, when the data object corresponds to a non-static attribute of network device 220, master agent device 222 may obtain the data object from network device 220 by transmitting an object request for the data object to subagent device 224. Master agent device 222 may obtain data objects corresponding to non-static attributes from subagent device 224 based on values of the non-static attributes being likely to change between network information requests for the non-static attributes.

In some implementations, subagent device 224 may obtain multiple, different data objects (e.g., based on receiving a request for a tabular data object, based on receiving a request for multiple data objects, etc.). In such a case, a first subset of the multiple, different data objects may correspond to static attributes, and a second subset of the multiple, different data objects may correspond to non-static attributes. In such a case, master agent device 222 may selectively obtain the multiple, different data objects from subagent device 224 or from static information device 230. For example, master agent device 222 may obtain data objects of the first subset from static information device 230 when static information device 230 stores the data objects of the first subset, and may otherwise obtain the data objects of the first subset from subagent device 224. Thus, master agent device 222 conserves processor resources that are otherwise used to obtain all of the data objects of the first subset from subagent device 224. Master agent device 222 may obtain the data objects of the second subset from subagent device 224 based on the data objects of the second subset corresponding to non-static attributes.

As further shown in FIG. 4, process 400 may include providing the data object (block 490). For example, master agent device 222 may provide the data object to network management device 210 based on the network information request. In some implementations, master agent device 222 may provide multiple, different data objects or attributes (e.g., when the network information request identifies the multiple, different data objects or attributes, when the data object is a tabular data object, etc.). By selectively obtaining the data object from static information device 230 or from subagent device 224, master agent device 222 conserves processor resources of subagent device 224 and/or network device 220 that would otherwise be used to obtain the data object from subagent device 224 in every case (e.g., when the data object is repetitively requested based on a script or program, etc.). Further, master agent device 222 may reduce latency associated with obtaining data objects by obtaining the data objects from static information device 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
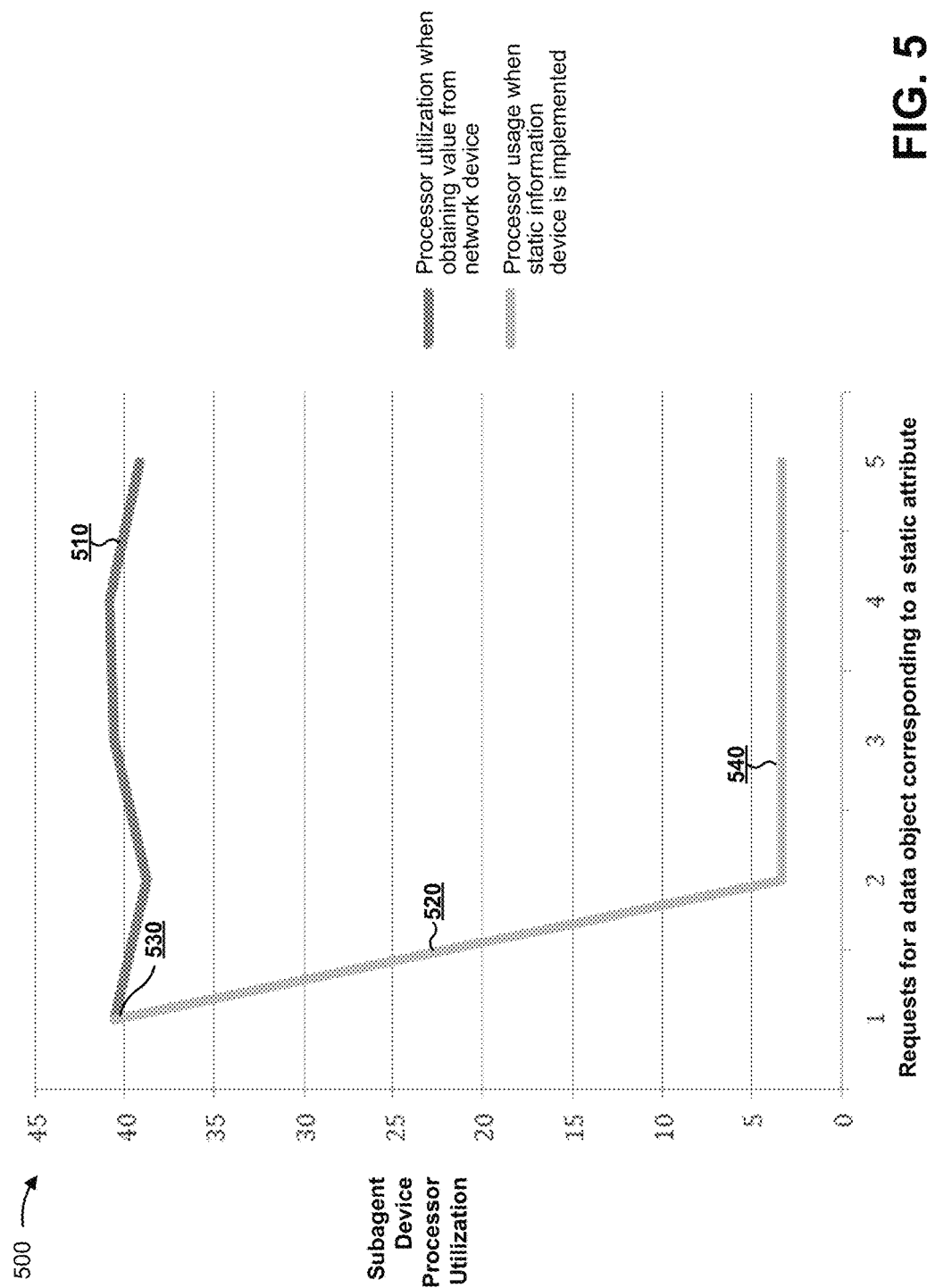
FIG. 5 is an example graph of processor utilization of an agent device when selectively obtaining a data object that corresponds to a static attribute from a static information device or from a network device.

FIG. 5 is an example graph 500 of processor utilization of an agent device when selectively obtaining a data object that corresponds to a static attribute from a static information device or from a network device. Reference number 510 shows an example of processor usage when master agent device 222 obtains the data object from subagent device 224 irrespective of whether the data object is stored by static information device 230. As can be seen, in such a case, subagent device 224 may have between approximately 38 percent and 42 percent processor utilization for each network information request for the data object.

Reference number 520 shows an example of processor usage when master agent device 222 selectively obtains the data object from static information device 230 or from subagent device 224. As shown by reference number 530, subagent device 224 may have approximately 41 percent processor utilization when obtaining the data object for the first time. For example, master agent device 222 may determine that the data object is not stored by static information device 230 (e.g., based on master agent device 222 not having previously provided the data object for storage by static information device 230), and may obtain the data object from subagent device 224. Thus, processor utilization for the first network information request is approximately equal with regard to the examples shown by reference numbers 510 and 520.

As shown by reference number 540, subagent device 224 may have approximately 4 percent processor utilization for each subsequent network information request for the data object. For example, after obtaining the data object from network device 220, subagent device 224 may cause static information device 230 to store the data object. For each subsequent network information request that identifies the data object, master agent device 222 may determine that static information device 230 stores the data object, and may obtain the data object from static information device 230. Thus, by using static information device 230 to store data objects corresponding to static attributes, processor consumption of subagent device 224 may be reduced by approximately 90 percent.

As indicated above, FIG. 5 is provided merely as an example. Other examples are possible and may differ from what was described with regard to FIG. 5.

By using a static information device to store data objects corresponding to static attributes that are unlikely to change between network information requests, a master agent device conserves processor resources of subagent devices and/or a network device associated with the data objects. Further, the master agent device conserves network resources that would otherwise be used to transmit the data objects between the agent device and the network device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more memories; and
one or more processors, implemented at least partially in hardware, to:
 receive a network information request that identifies a data object relating to a network device,
  the data object corresponding to or identifying an attribute associated with the network device;
 determine that the attribute is a static attribute relating to a configuration of the network device based on one or more of:
  a format of an object identifier that identifies the data object, or
  an offset of the object identifier that identifies the data object;
 transmit a request to a static information device for information indicating whether the static information device stores the data object,
  the static information device being a separate device from the first device to store data objects corresponding to static attributes;
 receive the information from the static information device indicating whether the static information device stores the data object;
 determine whether the static information device stores the data object based upon receiving the information indicating whether the static information device stores the data object;
 selectively obtain the data object from the network device or from the static information device based on determining whether the static information device stores the data object,
  the data object to be obtained from the network device when the static information device does not store the data object,
   the first device to cause the static information device to store the data object after obtaining the data object from the network device, and
  the data object to be obtained from the static information device when the static information device stores the data object; and
 provide the data object based on the network information request.

2. The first device of claim 1, where the network information request is a first network information request; and
where the one or more processors are further to:
 receive a second network information request that identifies the data object;

determine that the static information device stores the data object based on receiving the second network information request; and obtain the data object from the static information device based on determining that the static information device stores the data object.

3. The first device of claim 1, where the network information request is a first network information request, and the data object is a first data object; and where the one or more processors are further to:
receive a second network information request that identifies a second data object;
determine that the second data object does not correspond to or identify a static attribute of the network device; and
obtain the second data object from the network device based on determining that the second data object does not correspond to or identify a static attribute of the network device.

4. The first device of claim 1, where the attribute is a first attribute;

where the data object corresponds to the first attribute and to a second attribute; and where the one or more processors, when selectively obtaining the data object, are to:
selectively obtain the second attribute from the network device, or from the static information device, based on whether the second attribute is a static attribute,
the second attribute being obtained from the static information device when the second attribute is a static attribute, and
the second attribute being obtained from the network device when the second attribute is not a static attribute.

5. The first device of claim 1, where the one or more processors are to:
receive an updated value of the static attribute corresponding to or identified by the data object; and
cause the static information device to store the updated value of the static attribute.

6. The first device of claim 1, where the one or more processors, when determining that the static information device stores the data object, are to:
determine that the static information device stores the data object based on information indicating that the first device previously provided the data object to the static information device for storage.

7. A non-transitory computer-readable medium storing instructions, the instructions comprising:
one or more instructions that, when executed by one or more processors of a first device, cause the one or more processors to:
receive a network information request that identifies a data object relating to a network device,
the data object corresponding to an attribute associated with the network device;
determine that the attribute is a static attribute that relates to a configuration of the network device based on one or more of:
a format of an object identifier that identifies the data object, or
an offset of the object identifier that identifies the data object;
transmit a request to a static information device for information indicating whether the static information device stores the data object,
the static information device being a separate device from the first device to store data objects corresponding to static attributes;
receive the information from the static information device indicating whether the static information device stores the data object;
determine whether the static information device stores the data object based on receiving the information indicating whether the static information device stores the data object;
selectively obtain the data object from the network device, or from the static information device, based on determining whether the static information device stores the data object,
the data object to be obtained from the network device when the static information device does not store the data object,
the one or more processors to cause the static information device to store the data object after obtaining the data object from the network device, and
the data object to be obtained from the static information device when the static information device stores the data object; and
provide the data object based on the network information request.

8. The non-transitory computer-readable medium of claim 7, where the one or more instructions, when executed by the one or more processors, cause the one or more processors to:
receive an updated value of the data object; and
cause the static information device to store the updated value of the data object.

9. The non-transitory computer-readable medium of claim 7, where the network information request is a first network information request; and where the one or more instructions, when executed by the one or more processors, cause the one or more processors to:
receive a second network information request that identifies the data object;
determine that the data object is stored by the static information device based on causing the static information device to store the data object; and
obtain the data object from the static information device.

10. The non-transitory computer-readable medium of claim 7, where the data object corresponds to a plurality of attributes,
a first subset of attributes, of the plurality of attributes, being static attributes, and
a second subset of attributes, of the plurality of attributes, being non-static attributes; and
where the one or more instructions, that cause the one or more processors to selectively obtain the data object from the network device or the static information device, cause the one or more processors to:
obtain the first subset of attributes from the static information device; and
obtain the second subset of attributes from the network device.

11. The non-transitory computer-readable medium of claim 7, where the one or more instructions, when executed by the one or more processors, cause the one or more processors to:
receive an instruction to cause the static information device to delete the data object from storage; and cause the static information device to delete the data object from storage based on the instruction.

12. A method, comprising:
receiving, by a first device, a request to obtain a data object relating to a network device,
the data object corresponding to an attribute associated with the network device;
determining, by the first device, that the attribute is a static attribute,
the static attribute being determined to be an attribute that relates to a configuration of the network device based on one or more of:
a format of an object identifier that identifies the data object, or
an offset of the object identifier that identifies the data object;
transmitting, by the first device, a request to a static information device for information indicating whether the static information device stores the data object,
the static information device being a separate device from the first device to store data objects corresponding to static attributes;
receiving, by the first device, the information from the static information device indicating whether the static information device stores the data object;
determining, by the first device, whether the static information device stores the data object based upon receiving the information indicating whether the static information device stores the data object;
selectively obtaining, by the first device, the data object from the network device, or from the static information device, based on determining whether the static information device stores the data object,
the data object to be obtained from the network device when the static information device does not store the data object,
the first device to cause the static information device to store the data object after obtaining the data object from the network device, and
the data object to be obtained from the static information device when the static information device stores the data object; and
providing, by the first device, the data object based on the request.

13. The method of claim 12, further comprising:
providing the data object to the static information device for storage after obtaining the data object from the network device.

14. The method of claim 12, where receiving the request further comprises:
receiving the request from a network management device,
the network management device to provide the request based on determining that the data object is not stored by a cache associated with the network management device.

15. The method of claim 12, further comprising:
receiving an updated value of the data object; and
providing the updated value of the data object to the static information device for storage.

16. The method of claim 12, where determining whether the static information device stores the data object comprises:
providing an object request for the data object to the static information device; and
determining, based on a response to the object request, whether the static information device stores the data object.

17. The method of claim 12, where the data object corresponds to a plurality of attributes,
a first subset of attributes, of the plurality of attributes, being static attributes,
the first subset of attributes being stored by the static information device, and
a second subset of attributes, of the plurality of attributes, being non-static attributes; and
where selectively obtaining the data object from the network device or the static information device comprises:
obtaining the first subset of attributes from the static information device; and
obtaining the second subset of attributes from the network device.

18. The first device of claim 1, where the attribute includes:
a physical address of the first device,
a router name of the first device, or
a physical interface name of the first device.

19. The first device of claim 1, where the attribute includes a configuration of a keep-alive message to be transmitted or received by the first device.

20. The non-transitory computer-readable medium of claim 7, where the attribute includes:
a physical address of the first device,
a router name of the first device,
a physical interface name of the first device, or
a configuration of a keep-alive message to be transmitted or received by the first device.

* * * * *